United States Patent
Bhuiyan et al.

(10) Patent No.: US 12,137,145 B1
(45) Date of Patent: Nov. 5, 2024

(54) NESTED RESOURCE IDENTITY MANAGEMENT FOR CLOUD RESOURCES

(71) Applicant: Oracle International Corporation, Redwood Shores, CA (US)

(72) Inventors: A M Helali Mortuza Bhuiyan, Redmond, WA (US); Pritesh Kiritkumar Patel, Sammamish, WA (US); Ayman Mohammed Aly Hassan Elmenshawy, Bellevue, WA (US); Thomas James Andrews, Seattle, WA (US); Sreedhar Katti, Bangalore (IN); Jason Anthony Slepicka, Long Beach, CA (US); Jakub Karol Wojciak, North Vancouver (CA); Kenneth Choi Kil, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/373,707

(22) Filed: Sep. 27, 2023

(30) Foreign Application Priority Data

Sep. 15, 2023 (IN) .............................. 202341062291

(51) Int. Cl.
   *H04L 67/141* (2022.01)
   *G06Q 30/01* (2023.01)

(52) U.S. Cl.
   CPC .......... *H04L 67/141* (2013.01); *G06Q 30/01* (2013.01)

(58) Field of Classification Search
   CPC .............................. H04L 67/141; G06Q 30/01
   See application file for complete search history.

(56) References Cited

U.S. PATENT DOCUMENTS 8,903,705 B2 * 12/2014 Douceur ............... G06F 9/4555
                                                                       718/1
2021/0409219 A1 * 12/2021 Elmenshawy ........ H04L 9/3228
(Continued)

FOREIGN PATENT DOCUMENTS

WO    WO-2023055734 A1 *  4/2023  ......... H04L 63/0807

OTHER PUBLICATIONS

"Oracle Cloud infrastructure Infrastructure Documentation", Available online at: https://web.archive.org/web/20230320184207/https://docs.oracle.com/en-us/iaas/Content/Functions/Tasks/functionsaccessingociresources.html, Mar. 20, 2023, pp. 1-5.
(Continued)

*Primary Examiner* — Philip C Lee
(74) *Attorney, Agent, or Firm* — Kilpatrick Townsend & Stockton LLP

(57) ABSTRACT

A system is disclosed that includes capabilities by which a nested sub-resource residing in a service tenancy can access a customer-owned resource residing in a customer tenancy without the use of a cross-tenant policy. The disclosed system provides the ability for a nested sub-resource residing in a service tenancy to obtain the resource principal identity of a higher-level resource residing in the customer tenancy and use the identity of the higher-level resource to access a customer-owned resource residing in the customer tenancy. Using the resource principal identity of its higher-level resource, the sub-resource can access a customer-owned resource that resides in a customer tenancy in a seamless way without having to write a cross-tenancy policy statement that provides permission to the sub-resource to access the customer-owned resource.

18 Claims, 11 Drawing Sheets

(56) References Cited

U.S. PATENT DOCUMENTS

| | | | | |
|---|---|---|---|---|
| 2021/0409345 | A1* | 12/2021 | Elmenshawy | G06F 21/44 |
| 2023/0100200 | A1* | 3/2023 | Evani | H04L 9/3247 |
| | | | | 713/185 |
| 2023/0246962 | A1* | 8/2023 | Choi | H04L 45/76 |
| | | | | 709/238 |
| 2023/0247087 | A1* | 8/2023 | Nagaraja | H04L 9/3213 |
| | | | | 709/201 |
| 2023/0316229 | A1* | 10/2023 | Lalwani | H04L 67/60 |
| | | | | 705/301 |

OTHER PUBLICATIONS

Hardjono, "User-Managed Access (UMA) Core Protocol", Draft-Hardjono-Oauth-Umacore- 05.txt, Oct. 1, 2012, pp. 1-51.

International Application No. PCT/US2024/018625, International Search Report and Written Opinion mailed on May 31, 2024, 15 pages.

U.S. Appl. No. 18/584,951, Application as filed on Feb. 22, 2024, 67 pages.

* cited by examiner

NESTED RESOURCE IDENTITY MANAGEMENT FOR CLOUD RESOURCES

CROSS-REFERENCE TO RELATED APPLICATION

The present application claims the benefit and priority of India provisional application number 202341062291, filed Sep. 15, 2023, entitled, "Nested Resource Identity Management for Cloud Resources," the contents of which are incorporated by reference in its entirety for all purposes.

BACKGROUND

The demand for cloud-based services continues to increase rapidly. The term cloud service is generally used to refer to a service that is made available to users or customers on demand (e.g., via a subscription model) using systems and infrastructure (cloud infrastructure) provided by a cloud services provider. Typically, the servers and systems that make up the cloud service provider's infrastructure are separate from the customer's own on-premise servers and systems. Customers can thus avail themselves of cloud services provided by a cloud service provider without having to purchase separate hardware and software resources for the services. There are various different types of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

To take advantage of the numerous benefits provided by cloud services, in some cases, a customer may want to share its resources with an external entity (e.g., the CSP or a third-party tenancy) that is outside the customer's tenancy. To access and share resources, the administrators of both tenancies need to typically create special policy statements that explicitly state the resources that can be accessed and shared. In some situations, to enable resources to be accessed and shared across tenancies, the internal details (e.g., the resource identities) of the resources need to be exposed to the administrators of the different tenancies. Additionally, writing complex cross-tenancy policies can be cumbersome for a customer and can compromise the security of cloud-based services.

BRIEF SUMMARY

The present disclosure relates generally to the secure access of cloud-based resources. More specifically, but not by way of limitation, the present disclosure describes a nested resource principals management system that includes capabilities for enabling a resource residing in a first tenancy to access a customer-owned resource residing in a different tenancy without using a cross-tenancy policy.

In certain embodiments, a nested resource principals management system is disclosed. The system obtains a first identity for a first resource residing in a service tenancy of a cloud service provider (CSP). In certain examples, the first resource may represent a nested sub-resource that resides in the service tenancy of the CSP, where the resource is part of a higher-level resource (a second resource). The second resource resides in the customer tenancy. The first identity associated with the first resource may correspond to a resource principal identity (RPT) associated with the first resource. The RPT is a secure identity provided to a cloud infrastructure resource that enables the resource to be authorized to access other cloud infrastructure resources.

In certain examples, the system obtains the RPT for the first resource from a service control plane associated with the resource. The system additionally obtains information identifying the second resource. The information identifies the endpoint of the second resource and may represent a URL of the resource endpoint for the second resource.

The system then obtains a first token for the first resource using the first identity. The first token enables the first resource to assert the first identity. The first token corresponds to a resource principal session token (RPST) associated with the first resource. The RPST for a resource is a temporary session token and a secure credential that enables the resource to authenticate itself (assert its resource principal identity) to other cloud-resources owned by the CSP.

In certain embodiments, the system obtains a second identity associated with the second resource. The second identity may correspond to a resource principal identity (RPT) associated with the second resource and may be obtained by the nested resource principals management system from the control plane associated with the second resource. The system subsequently obtains a second token for the first resource using the second identity. The second token enables the first resource to assert the second identity. In a certain implementation, the second token corresponds to a resource principal session token (RPST) associated with the second resource. In certain examples, the resource then uses the second token to access a customer-owned resource that resides in the customer tenancy.

BRIEF DESCRIPTION

FIG. 1 depicts a simplified diagram of a computing environment 100 including a nested resource principals management system that includes capabilities for enabling a nested sub-resource residing in a service tenancy of a cloud service provider (CSP) to access a customer-owned resource in a customer tenancy without a cross-tenancy policy call.

FIG. 2 describes an example of the processing performed by a control plane associated with a service in a service tenancy to provision a resource in the service tenancy, according to certain embodiments.

DETAILED DESCRIPTION

Figure 1:
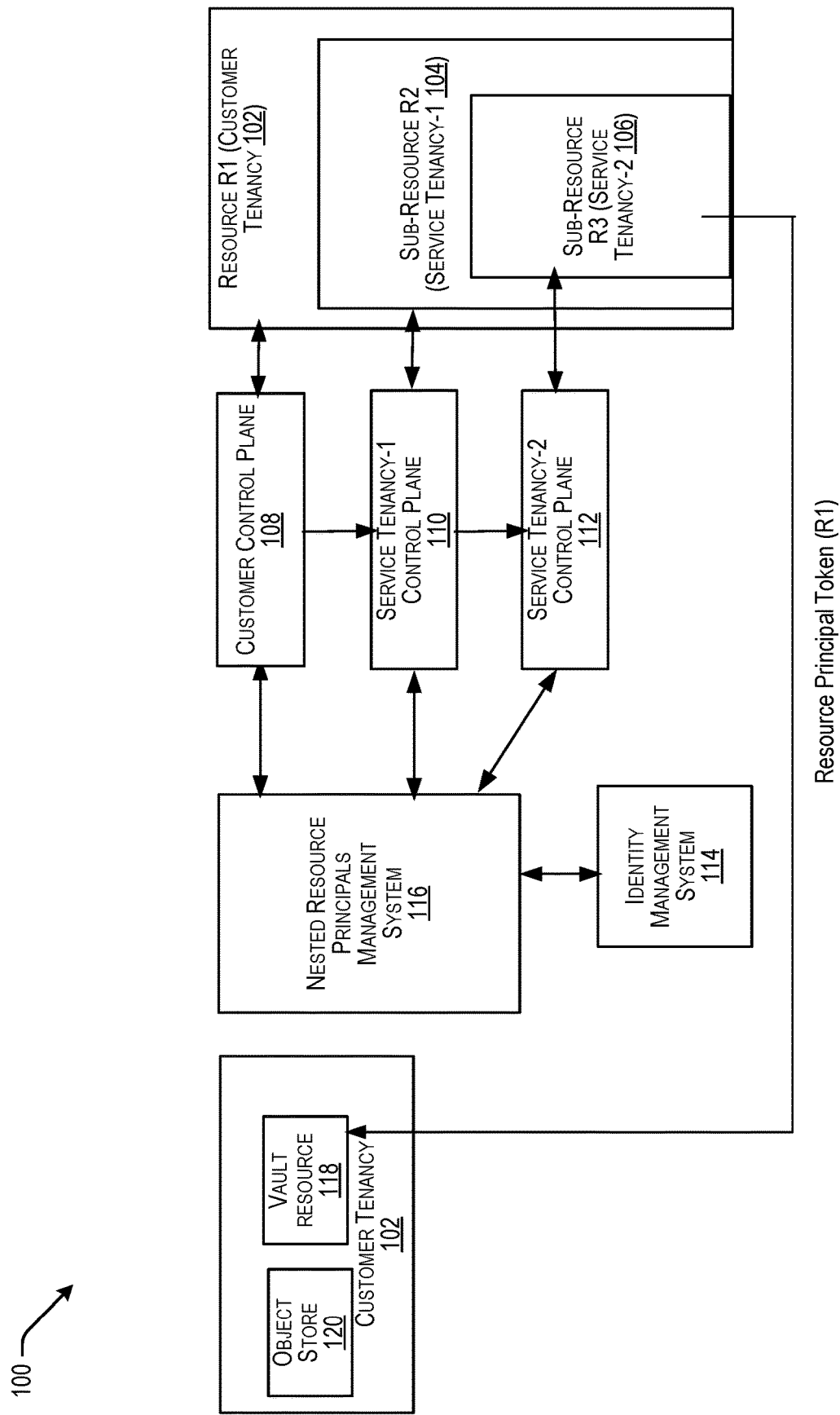

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to the secure access of cloud-based resources. More specifically, but not by way of limitation, the present disclosure describes a nested resource principals management system that includes capabilities for enabling a resource residing in a first tenancy to access a customer-owned resource residing in a different tenancy without using a cross-tenancy policy.

As previously described, to successfully write a cross-policy statement that enables resources to be shared across different tenancies, the internal details (e.g., the resource identities) of the resources need to be exposed to the administrators of the different tenancies. Existing approaches for enabling a resource residing in a first tenancy (e.g., a service tenancy) to access to a customer-owned resource residing in a different tenancy (e.g., a customer tenancy) traditionally involves the customer writing a cross-tenancy policy to enable the resource to successfully make a cross-tenancy call to the customer-owned resource. This typically involves the resource principal identities of the resources to be made available to the customer so that the customer can successfully write a cross-tenant policy that provides permission to the resource residing in the service tenancy to access the customer-owned resource. Exposing the resource principal identities of resources provisioned in a tenancy (e.g., a service tenancy) that is different from the customer's tenancy is not ideal and can potentially compromise the security of cloud resources.

As described herein, a service tenancy and a customer tenancy may correspond to secure and isolated partitions of a cloud infrastructure provided by the CSP to create, organize and administer cloud resources. For example, a customer tenancy may refer to an account created for a customer of the CSP. The customer can be any entity such as an individual, an organization, an enterprise, and the like. When a customer subscribes to, or registers for a service provided by the CSP, a tenancy or an account is created for that customer and this tenancy or account is referred to as the customer tenancy. Different customer tenancies may be created for different customers of the CSP. A customer can then, via the customer's tenancy, access the subscribed-to one or more cloud resources associated with the account for that customer. In certain examples, a customer tenancy is associated with a compartment. A compartment refers to a logical container for organizing and controlling access to cloud resources (E.g., Compute, Storage, Network, Load Balancer, etc) created within that compartment.

A service tenancy (also referred to as a cloud provider tenancy) is a tenancy associated with the CSP that provides a secure and isolated partition or provisioning platform for provisioning, configuring, and managing the lifecycle of cloud resources associated with services provided by the CSP. In certain implementations, different service tenancies may be provided for different cloud services provided by the CSP. For example, a first service tenancy may be provided for a first cloud service provided by the CSP (e.g., Fusion Application (FA) cloud service), a second service tenancy may be provided for a second cloud service provided by the CSP (e.g., Data Science Service for training and provisioning Machine Learning (ML) models), a third service tenancy may be provided for a third cloud service provided by the CSP, and so on.

The various embodiments described in the present disclosure address the deficiencies of existing approaches by disclosing a nested resource principals management system that includes capabilities by which a nested cloud resource residing in a first tenancy (e.g., a service tenancy) can access a customer-owned resource residing in a second tenancy (e.g., a customer tenancy) without the use of a cross-tenant policy. In certain embodiments, the nested cloud resource is part of a higher-level resource that is created in a customer tenancy. The internal compositions of such a higher-level resource are usually hidden from the customer, who sees the resource as a single entity (i.e., a single logical resource) in the customer tenancy. The actual provisioning/allocation of the infrastructure resources (i.e., sub resources) that are composed within the higher-level resource are performed by services in the service tenancy that are responsible for managing those resources.

The disclosed system provides the ability for a nested sub-resource residing in the service tenancy to obtain a resource principal identity of a higher-level resource residing in the customer tenancy and use the identity of the higher-level resource to access a customer-owned resource residing in the customer tenancy. A resource principal identity, also referred to throughout this disclosure as a resource principal token (RPT) is a secure identity provided to a cloud infrastructure resource that enables a resource to be authorized to access other cloud infrastructure resources. In certain examples, the resource principal identity is a token signed by the authoritative service in the CSP that is responsible for managing the resource and which provides trusted metadata about the resource. By obtaining the resource principal identity of the higher-level resource, the sub-resource residing in the service tenancy is provided with the same permissions as its higher-level resource to access other customer-owned resources. Using the resource principal identity of its higher-level resource, the sub-resource residing in a service tenancy can access a customer-owned resource that resides in the customer tenancy in a seamless way using a generic policy associated with the high-level resource that provides permission for the higher-level resource to interact with other customer-owned resources in the customer tenancy. The customer does not have to write a separate cross-tenancy policy statement that provides permission to the sub-resource to access the customer-owned resource.

The system described in the present disclosure provides several technical advancements and/or improvements over conventional approaches for providing secure access to cloud-based resources. Using the disclosed system enables, a customer is able to write robust and simple access control policies that provide streamlined and secure access management of cloud resources. Using the capabilities provided by the disclosed system, a customer has to only write a single policy that is directed to the higher-level resource owned by the customer in the customer tenancy. Since the customer does not have to write policies directed to the sub-resources that are composed within a higher-level resource, the details (e.g., resource principal identities) of the sub-resources do not have to be exposed to the customer. Additionally, changes can be made to sub-resources (e.g., adding new resources, changing the hierarchy or the resources, deleting a resource and so on) composed within a higher-level resource without impacting the customer or compromising the security of the resources.

Referring now to the drawings, FIG. 1 depicts a simplified diagram of a computing environment 100 including a nested resource principals management system that includes capabilities for enabling a nested sub-resource residing in a service tenancy of a cloud service provider (CSP) to access a customer-owned resource in a customer tenancy without a cross-tenancy policy call, according to certain embodiments. As previously described, a service tenancy and a customer tenancy may correspond to secure and isolated partitions of a cloud infrastructure provided by the CSP to create, organize and administer cloud resources. For example, a customer tenancy may refer to an account created for a customer of the CSP. The customer can be any entity such as an individual, an organization, an enterprise, and the like. When a customer subscribes to, or registers for a service provided by the CSP, a tenancy or an account is created for that customer and this tenancy or account is referred to as the customer tenancy. Different customer tenancies may be created for different customers of the CSP. A customer can then, via the customer's tenancy, access the subscribed-to one or more cloud resources associated with the account for that customer. In certain examples, the customer tenancy is associated with a compartment. A compartment refers to a logical container for organizing and controlling access to cloud resources (E.g., Compute, Storage, Network, Load Balancer, etc) created within that compartment.

A service tenancy (also referred to as a cloud provider tenancy) is a tenancy associated with the CSP that provides a secure and isolated partition or provisioning platform for provisioning, configuring, and managing the lifecycle of cloud resources associated with services provided by the CSP. In certain implementations, different service tenancies may be provided for different cloud services provided by the CSP. For example, a first service tenancy may be provided for a first cloud service provided by the CSP (e.g., Fusion Application (FA) cloud service), a second service tenancy may be provided for a second cloud service provided by the CSP (e.g., Data Science Service for training and provisioning Machine Learning (ML) models), a third service tenancy may be provided for a third cloud service provided by the CSP, and so on.

For example, for a Fusion Application (FA) cloud service, the service tenancy provided for this service may include capabilities for provisioning a FA resource for a customer of the CSP. The FA resource may represent a type of cloud resource that is provided by the CSP to a customer for enterprise resource planning purposes. In certain examples, the provisioning of a cloud resource (e.g., an FA resource) may involve the provisioning of multiple lower-level infrastructure resources that are composed within the cloud resource such as databases, buckets, and object stores. However, the internal compositions of the cloud resource are usually hidden from the customer, who sees the resource as a single entity (i.e., a single logical resource). The creation of the cloud resource is typically performed by a customer in the customer tenancy while the actual provisioning/allocation of the lower-level infrastructure resources (also referred to herein as sub-resources) that are part of the higher-level resource are performed by services in the service tenancy that are responsible for managing those resources. Once provisioned, the customer can interact with the higher-level resource (also referred to herein as a root resource) and write policies for the resource to grant the resource access to other resources within the customer tenancy (e.g., an object storage buckets, vault secrets and so on) as well as for resources that reside in different tenancies (e.g., service tenancies, third party tenancies and so on).

For example, as depicted in FIG. 1, a customer may create a resource R1 in a customer tenancy 102. The resource R1 may be composed of multiple lower-level resources (sub-resources, R2 and R3). The resource R1 represents the highest-level resource (root resource) and R2 and R3 represent child resources of the resource R1. For example, as previously described, the resource R1 may represent a fusion pod or a fusion application (FA) resource that the customer may utilize for enterprise resource planning purposes. Such a resource (R1) may be composed of multiple sub-resources, R2 and R3 (e.g., databases, buckets and keys). In the example depicted in FIG. 1, the sub-resources, R2 and R3 of the resource R1 also hierarchically related, where R3 is a child resource of its parent resource, R2.

The internal compositions (for e.g., R2 and R3) of the resource R1 are usually hidden from the customer, who sees the resource R1 as a single entity (i.e., a single logical resource) in the customer tenancy. The sub-resources are typically provisioned by various downstream service control planes that reside in one or more service tenancies of the CSP. For instance, as depicted in FIG. 1, to provision the resource R1, a customer (e.g., an end-user associated with the customer) may transmit a resource creation request to a customer control plane (e.g., 108) associated with the resource R1. The resource creation request is received by the customer control plane R1 108 associated with the resource R1. The customer control plane R1 108 may be associated with an authoritative service that owns and is responsible for creating and managing/the resource R1 in the customer tenancy. Upon receiving the resource creation request, the customer control plane R1 108 bootstraps/provisions an instance of the resource R1 and sets the endpoint of the resource R1 to the customer control plane R1 108. The customer control plane R1 108 then creates a resource principal identity for the resource R1 and may also provide metadata associated with the resource R1 (e.g., tags, compartment identifier of the customer tenancy, and so on) to the customer.

A resource principal identity, also referred to throughout this disclosure as a resource principal token (RPT) is a secure identity provided to a cloud infrastructure resource that enables a resource to be authorized to access other cloud infrastructure resources. In certain examples, the resource principal identity is a token signed by the authoritative service in the CSP which provides trusted metadata about the resource. Once provisioned, the customer can interact with the resource R1 and write policies for the resource that grant this resource access to other customer tenancy resources such as vault resources 118, object stores 120 and the like.

Upon creating the instance of the resource R1 in the customer tenancy 102 as described above, the customer control plane R1 108 then initiates the creation of the child resource R2 by communicating with the service control plane R2 110 that is associated with the authoritative service in the service tenancy-1 104 that owns the resource R2. Upon receiving the resource creation request, the service control plane R2 110 bootstraps/provisions an instance of the resource R2 and sets the endpoint of the resource R2 to the service control plane R2 110. The service control plane R2 110 then creates a resource principal identity for the resource R2. The resource R3 that is a child resource of resource of R2 is similarly provisioned by its service control plane R3 112 in service tenancy-2 106. Additional details related to the processing performed by a service control plane for provisioning a sub-resource (e.g., R2 or R3) that is composed within a higher level resource (R1) is described below with respect to FIG. 2 and its accompanying description.

In certain situations, a sub-resource (e.g., R3) that that is composed within a resource R1 may wish to access a customer-owned resource (e.g., a vault resource 118) residing in the customer tenancy. Since the sub-resource R3 is provisioned in a service tenancy and the customer-owned resource resides in the customer tenancy, in order for the sub-resource R3 to access the vault resource, a customer is typically expected to write a cross-tenant policy that enables the sub-resource R3 to access the vault resource. For instance, the sub-resource R3 may represent a database resource that is composed within a higher-level FA resource described above. The database resource may need to access a resource (e.g., an encryption key) from the customer-owned vault resource 118. The data in the database resource may be encrypted using the encryption key which is provided by the customer and the encryption key resides in the customer tenancy. Since the database resource resides in the service tenancy, when the database resource tries to access the key from the vault resource 118, a cross-tenancy call needs to be made by the database resource to access the vault resource.

Existing approaches for enabling a sub-resource that is composed within a higher-level resource to access to a customer-owned resource typically involves the customer writing a cross-tenancy policy to enable the sub-resource to successfully make a cross-tenancy call to the customer-owned resource. This typically involves the resource principal identities of both the database resource and the vault resource to be made available to the customer so that the customer can successfully write a cross-tenant policy that provides permission to the sub-resource to access the customer-owned resource. Exposing the resource principal identities of resources provisioned in a tenancy (e.g., a service tenancy) that is different from the customer's tenancy is not ideal and can potentially compromise the security of the cloud resources.

The various embodiments described in the present disclosure address the deficiencies of existing approaches for providing secure resource access by disclosing a nested resource principals management system 116 that includes capabilities by which a nested sub-resource residing in one tenancy (e.g., a service tenancy) can access a customer-owned resource residing in a different tenancy (e.g., a customer tenancy) without the use of a cross-tenant policy. The nested resource principals management system 116 provides the ability for a nested sub-resource residing in a service tenancy to obtain the resource principal identity of a higher-level resource residing in the customer tenancy) and use the identity of the higher-level resource to access a customer-owned resource residing in the customer tenancy. By obtaining the resource principal identity of the higher-level resource, the sub-resource residing in a service tenancy is provided with the same permissions as its higher-level resource to access other customer-owned resources. Using the resource principal identity of its higher-level resource, the sub-resource can access a customer-owned resource that resides in a customer tenancy in a seamless way using a generic policy associated with the high-level resource that provides permission for the higher-level resource to interact with other customer-owned resources. The customer does not have to write a separate cross-tenancy policy statement that provides permission to the sub-resource to access the customer-owned resource.

The disclosed system thus enables a customer to write robust and simple access control policies that provide streamlined and secure access management of cloud resources. Using the capabilities provided by the disclosed system, a customer has to only write a single policy that is directed to the highest-level resource (root resource) owned by the customer in the customer tenancy. Since the customer does not have to write policies directed to the sub-resources that are composed within a higher-level resource, the details (e.g., resource principal identities) of the sub-resources do not have to be exposed to the customer. Additionally, changes can be made to sub-resources (e.g., adding new resources, changing the hierarchy or the resources, deleting a resource and so on) composed within a higher-level resource without impacting the customer or compromising the security of the resources.

In certain embodiments, the nested resource principals management system 116 interacts with an identity management system 114 in the CSP to obtain a resource principal identity for a nested sub-resource. Details related to the processing performed by the nested resource identity management system and the identity management system are described below with respect to FIG. 3 and its accompanying description.

Computing environment 100 depicted in FIG. 1 is merely an example and is not intended to unduly limit the scope of claimed embodiments. One of ordinary skill in the art would recognize many possible variations, alternatives, and modifications. For example, in some implementations, the computing environment 100 can be implemented using more or fewer subsystems than those shown in FIG. 1, may combine two or more subsystems, or may have a different configuration or arrangement of subsystems. The subsystems 114 and 116 depicted in FIG. 1 may be implemented using only software (e.g., code, instructions, program) executed by one or more processing units (e.g., processors, cores) of a computing system, hardware, or combinations thereof. The software may be stored on a non-transitory storage medium (e.g., on a memory device).

Figure 2:
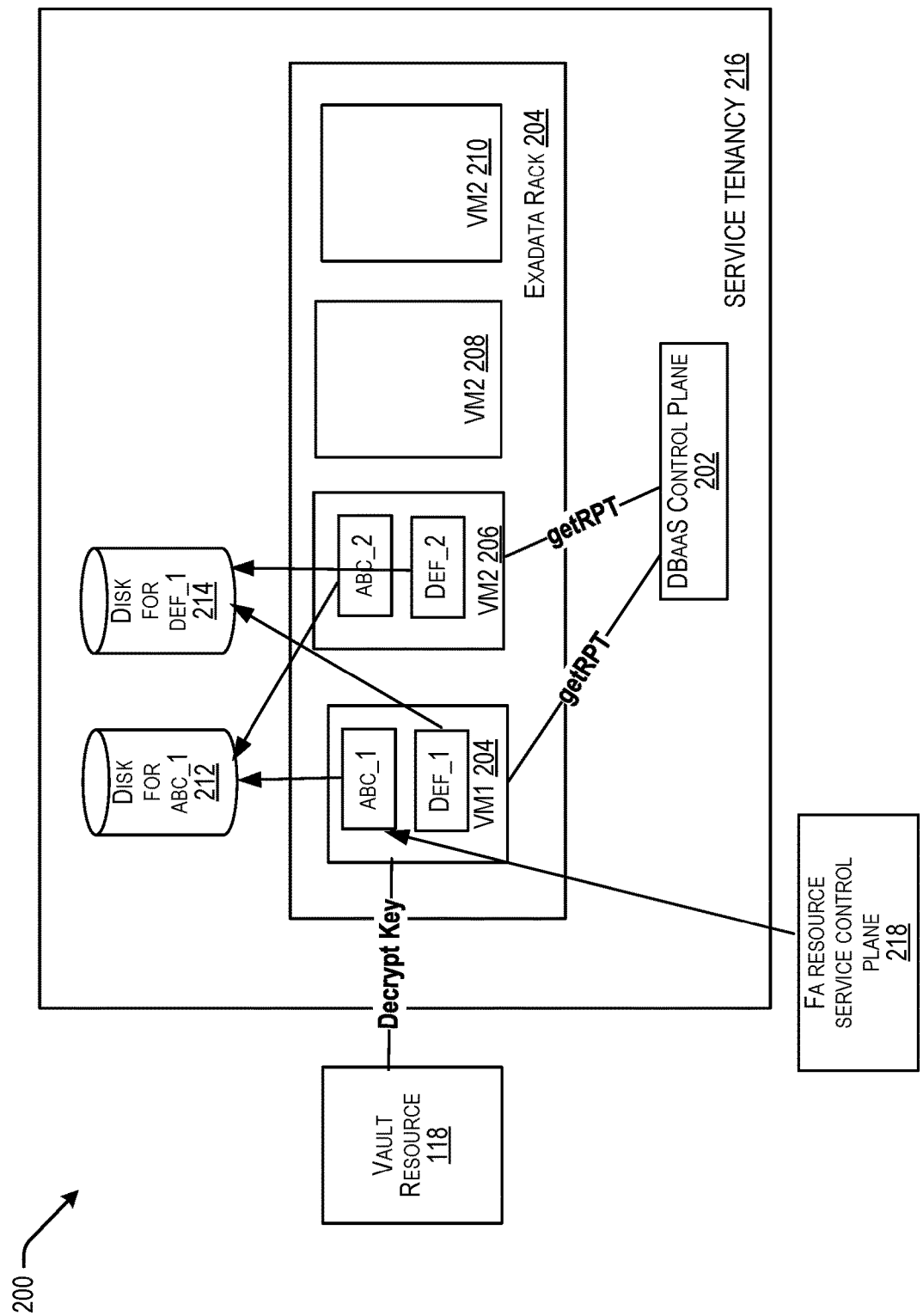

FIG. 2 describes an example of the processing performed by a control plane associated with a service in a service tenancy to provision a resource in the service tenancy, according to certain embodiments. In certain examples, such as in the embodiment described in FIG. 1, the resource may represent a nested sub-resource (e.g., R2) that resides in the service tenancy, where the resource R2 is composed within a higher-level resource R1 that resides in the customer tenancy. For instance, the higher-level resource may represent an FA resource and the sub-resource R2 may represent a database resource that is composed within the FA resource. As described in FIG. 1, upon creating an instance of the higher-level (root) resource R1 in the customer tenancy, the customer control plane R1 108 associated with the resource R1 initiates the creation of the sub-resource (R2) by calling the service control plane (e.g., control plane R2 110) that is associated with the authoritative downstream service that owns the resource R2 in the service tenancy and is responsible for provisioning the sub-resource R2 in the service tenancy.

In the example shown in FIG. 2, the downstream service represents a database service (Database as a Service (DBaaS)) in a service tenancy 216 that is responsible for provisioning an instance of a database resource composed within a higher-level FA resource. Upon receiving an instance creation request from a customer control plane 218 of the FA resource, the control plane of the database service, DBaaS Control Plane (CP) 202, provisions an instance of the database resource by allocating a virtual machine (VM) along with disk storage for the database resource in an Exadata Rack 204. As described herein, an Exadata Rack 204 represents a computing platform (i.e., a combined hardware and software platform) in the service tenancy 216 of the database service that allocates computing resources (storage and servers) for running database resources.

In certain examples, the allocation of an instance of a database resource (also referred to herein as an Exadata resource instance), involves, allocating by the DBaaS CP 202, a database process ("abc_1") running in a VM 204 within the Exadata rack 204 along with disk storage 212 for the database process ("abc_1"). In the example depicted in FIG. 2, the Exadata rack 204 is composed of multiple VMs (e.g., VM1 204, VM2 206, VM3 208, VMn 210). Multiple database processes (e.g., abc_1, def 1) may execute inside a particular VM (Exadata instance). For instance, "abc_1" may represent a database process within an Exadata resource instance that is allocated to a first customer of the CSP and "def 1" may represent a database process within the same Exadata instance along with disk storage 214 that is allocated to a different customer of the CSP. Each database instance (Exa instance) additionally has a secondary instance running in a secondary VM (e.g., VM2 206) for high availability. Each database process running in a VM is seeded with a file (e.g., a Json file) that is accessible to the database process. This file contains metadata information about the resource instance. Each database process also has a service identifier, which is a unique identifier that identifies the service that owns the database process. Each VM is also seeded with the DBaaS control plane endpoint that it can call to obtain its resource principal identity.

As previously described, the resource principal identity is an identifier for a resource (also referred to herein as a resource principal token (RPT)) that is signed by the authoritative service (e.g., DBaaS) which provides trusted metadata about the resource (e.g., resource id, tags, compartment identifier, etc.). In certain examples, a nested resource principals management system 116 (shown in FIG. 1) obtains the RPT for the database resource from the control plane 202 of the database resource and subsequently an RPT for the higher-level FA resource by communicating with a customer control plane 218 of the FA resource. The RPT of the FA resource is associated with a compartment (tenant) identifier and a service identifier that belongs to the customer tenancy. The database resource is then able to use the RPT of the FA resource to access the customer-owned resource (e.g., a vault resource 118 as shown in FIG. 1). The customer-owned resource sees the database resource with an RPT having a service identifier and tenancy information which is in the customer tenancy and provides the database resource with access to the encryption key in the vault resource 118 without the database resource needing to make a cross-tenancy call to access the vault resource 118.

In a certain implementation, the nested resource principals management system 116 may be implemented using software (e.g., code, instructions, program) that is executed by a client application running inside a database process (e.g., abc_1) shown in FIG. 2. The software may represent a collection of software development kit (SDK) tools that includes capabilities for obtaining a RPT for a resource from its corresponding service control plane. Using the RPT for a resource in the resource hierarchy, the nested resource principals management system 116 additionally interacts with an identity management system (e.g., 114 shown in FIG. 1) to obtain a resource principal session token (RPST) for the resource. In certain examples, the RPST for the resource represents a temporary session token and a secure credential associated with the resource that is provided by the Identity Management System to the nested resource principals management system 116. A resource uses its RPST to authenticate itself to other cloud-resources (e.g., infrastructure resources) and services owned by the CSP. Using the RPST, a resource is able to assert its resource principal identity (RPT) to other cloud-resources and services owned by the CSP. In a certain implementation, the RPST may be formatted as a Json Web Token (JWT) token and includes claims that identify the resource's host tenancy and compartment information. Using the RPST of a higher-level resource, a nested sub-resource (e.g., R2) residing in the service tenancy is able to access a customer-owned resource in a customer tenancy without making a cross-tenancy policy call. Additional details of the interactions between the nested resource identity management system and the identity management system for enabling a nested sub-resource residing in a service tenancy to access a customer-owned resource residing in a customer tenancy is described in FIG. 3.

Figure 3:
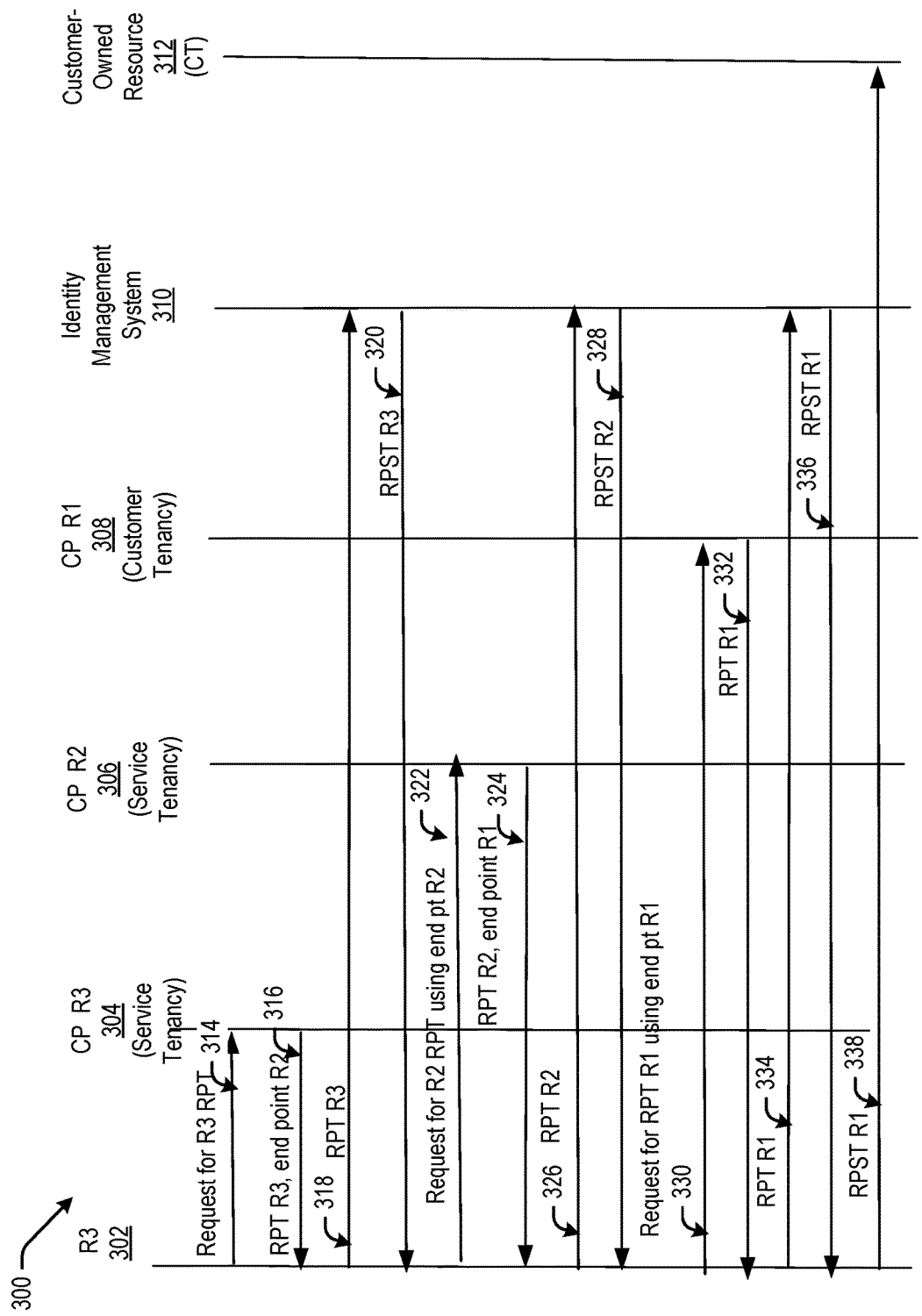
FIG. 3 is a sequence diagram that depicts a sequence of interactions that enable a nested sub-resource residing in a service tenancy to access a customer-owned resource residing in a customer tenancy, according to certain embodiments.

FIG. 3 is a sequence diagram that depicts a sequence of interactions that enable a nested sub-resource residing in a service tenancy to access a customer-owned resource residing in a customer tenancy, according to certain embodiments. In the example depicted in FIG. 3, the nested sub-resource R3 is part of a resource hierarchy comprising resources R2 and R1. The resources R1, R2, and R3 are hierarchically related to one another where R1 represents the highest-level resource in the hierarchy and R2 and R3 represent sub-resources in the hierarchy. Additionally, R2 and R3 are hierarchically related where R3 is a child resource (sub-resource) of R2.

As depicted in FIG. 3, processing is initiated at operation 314 when a nested sub-resource R3 302 provisioned in the service tenancy transmits request to the service control plane associated with the authoritative service that owns the resource R3 (CP R3 304) to request for a resource principal identifier (i.e., a RPT) for R3. In a certain implementation, the nested resource principals management system 116 (shown in FIG. 1) obtains the RPT for the resource R3 from the control plane 202 of the resource R3. For instance, as described in FIG. 2, the nested resource principals management system 116 may be implemented using software (e.g., code, instructions, program) that is executed by a client application running inside a process (e.g., abc_1) as shown in FIG. 2 in a virtual machine provisioned by the service for the resource. The software may represent a collection of software development kit (SDK) tools that includes capabilities for obtaining a RPT for a resource from its corresponding service control plane.

The control plane of R3 validates the request and upon validation, issues the RPT of the resource R3. At operation 316, the control plane of R3 transmits the RPT of the resource R3 along with information (e.g., endpoint) identifying a resource that is in the next-level of the resource hierarchy. In a certain implementation, the endpoint may represent a Uniform Resource Locator (URL) of the resource endpoint of the resource that is in the next-level of the resource hierarchy. In certain embodiments, such as the embodiment depicted in FIG. 1, since the resource R3 is a child resource of resource R2 which is its parent resource in the resource hierarchy, as a result of performing the operation 316, the resource R3 302 receives endpoint information identifying its next-level resource, R2, in the resource hierarchy.

At operation 318, the resource R3 transmits a request comprising its RPT to the identity management system (IDM) 310 to obtain a resource principal session token (RPST) for asserting its resource principal identity. As a result of performing the operation 318, the IDM 310 exchanges the RPT for the resource R3 for the RPST of R3. As previously described, the RPST for a resource is a temporary session token and a secure credential that enables the resource to authenticate itself (assert its resource principal identity) to other cloud-resources owned by the CSP. The identity management system 310 shown in FIG. 3 may be implemented in a similar manner as the identity management system 116 described in FIG. 1.

At operation 320, the identity management system 310 transmits the RPST to R3. At operation 322, the resource R3 uses its RPST that it obtained in 320 to call the endpoint of the next level resource R2 in the resource hierarchy. At operation 324, the control plane of the resource R2 (CP R2 306) receiving the call validates the request and upon validation, returns the RPT for the resource R2 and the endpoint information of a resource, if present, that is in the next-level of the resource hierarchy. In the example depicted in FIG. 3, the control plane of the resource R2 identifies the resource R1 as the next-level resource in the resource hierarchy and returns the RPT of the resource R2 as well as endpoint information of the resource R1 to R3. In a certain implementation, the nested resource principals management system 116 (shown in FIG. 1) obtains the RPT for the resource R2 from a control plane associated with the resource R2. At operation 326, the resource R3 transmits a request comprising the RPT of R2 to the identity management system (IDM) 310 to obtain a resource principal session token (RPST) for R2. As a result of performing the operation 326, the IDM 310 exchanges the RPT for the resource R2 for its RPST and at operation 328, the IDM transmits the RPST of R2 to R2.

At operation 330, the resource R3 uses the RPT of R2 and makes a call to the endpoint of the next-level resource R1 in the resource hierarchy to obtain a RPT for the resource R1. At operation 332, the control plane of R1 308 validates the request and upon validation, issues the RPT of R1. In a certain implementation, the nested resource principals management system 116 (shown in FIG. 1) obtains the RPT for the resource R1 from a control plane associated with the resource R1. At operation 334, the resource R3 requests for an RPST for resource R1 from the identity management system and at operation 336, the resource R3 obtains the RPST for R1 from the IDM 310.

The resource R3 thus obtains the RSPT for a resource until it reaches the highest level or root level (in this example, resource R1) in the resource hierarchy. As a result of executing operation 338, the resource R3 has three RSPTs, a first RPST representing the identity of itself, a second RPST representing the identity of its parent resource (R2) and a third RPST representing the identity of its grandparent (root) resource R1. Since the third RPST represents the identity of highest-level (root) resource R1 in the resource hierarchy and R1 resides in the customer tenancy, the nested lower-level resource R3 uses the RPST of the resource R1 to assert its identity when performing various operations such as to access a customer-owned resource 312. The customer-owned resource sees that the resource R3 has an RPST that comprises tenancy information and a service identifier that belongs to the customer tenancy and enables the resource R3 to access the customer-owned resource without requiring the resource R3 to make a cross-tenancy call.

The embodiments in FIGS. 1-3 depicted above described the creation of a cloud resource using a particular example of a Fusion Application (FA) resource created in a customer tenancy, where the sub-resources composed in the FA application resource are provisioned by different services tenancies of a CSP. Additionally, FIGS. 1-3 described the capabilities provided by the disclosed nested resource principals management system for enabling a nested lower-level resource (e.g., a database resource within the FA resource) to obtain and use the resource principal identity of its higher-level FA resource to access a customer-owned resource residing in a customer tenancy without the use of a separate cross-tenancy policy for providing permission to the lower-level resource to access the customer-owned resource.

The disclosed nested resource principals management system may additionally be configured to enable other different types of cloud resources provisioned in a service tenancy to access customer owned resources residing in a customer tenancy without the user of cross-tenant policies. For instance, in certain embodiments, the disclosed nested resource principals management system includes capabilities by which a nested sub-resource composed within a Machine Language (ML) Application can access a customer-owned resource in a customer tenancy without the sub-resource making a cross-tenancy call to access the customer-owned resource. As described herein, a ML application represents a type of cloud resource provided by the CSP to a customer for building, training, deploying, and managing a machine learning model (also referred to herein as an ML application). A ML Application is typically composed of a set of one or more building blocks comprising data storage resources (e.g., object storage buckets), execution resources and resources for serving model predictions. The execution resources may represent Job Run resources and Pipeline Run resources. These execution resources may be provisioned by managed infrastructure (i.e., a service tenancy or a provisioning platform) provided by a service in the CSP. The Job Run resource enables the execution of repeatable machine learning tasks for the ML application. The Job Run resource can automatically provision compute resources (such as CPU or GPU) based on the block volume, shape, and network configuration of the job required for model building. The Pipeline Run resource enables the execution of end-to-end machine learning workflows for the ML application. The Pipeline Run resource defines a workflow of tasks or steps for data import, data transformation, model training, and model evaluation.

In certain embodiments, the creation of the ML application (also referred to herein as a ML resource) is typically performed by a customer in the customer tenancy. The internal compositions of the ML application are usually hidden from the customer, who sees the application as a single entity (i.e., a single logical resource). The actual provisioning/allocation of the infrastructure resources (e.g., the Pipeline Run resource and the Job Run resource) that are composed within the ML application are performed by services in the service tenancy that are responsible for managing those resources. Once provisioned, the customer can interact with the ML application and write a policy to grant permission to the ML application to access to other resources within the customer tenancy as well as for resources that reside in different tenancies (e.g., service tenancies, third party tenancies and so on).

In certain embodiments, a sub-resource (e.g., a Job Run Resource) composed within the ML application may wish to access a customer-owned resource (e.g., an object store 120) residing in the customer tenancy. The disclosed nested resource principals management system enables the sub-resource to access the customer-owned resource using resource principal identity of its higher-level resource (ML application) that resides in the customer tenancy. By obtaining the resource identity of the higher-level resource, the sub-resource can access the customer-owned resource in a seamless way without making a cross-tenancy policy call to the customer-owned resource. Since the sub-resource is associated with the resource principal identifier of its higher-level resource, it can access the customer-owned resource using a generic policy associated with the higher-level resource that provides permission for the higher-level resource to interact with other customer-owned resources.

Figure 4:
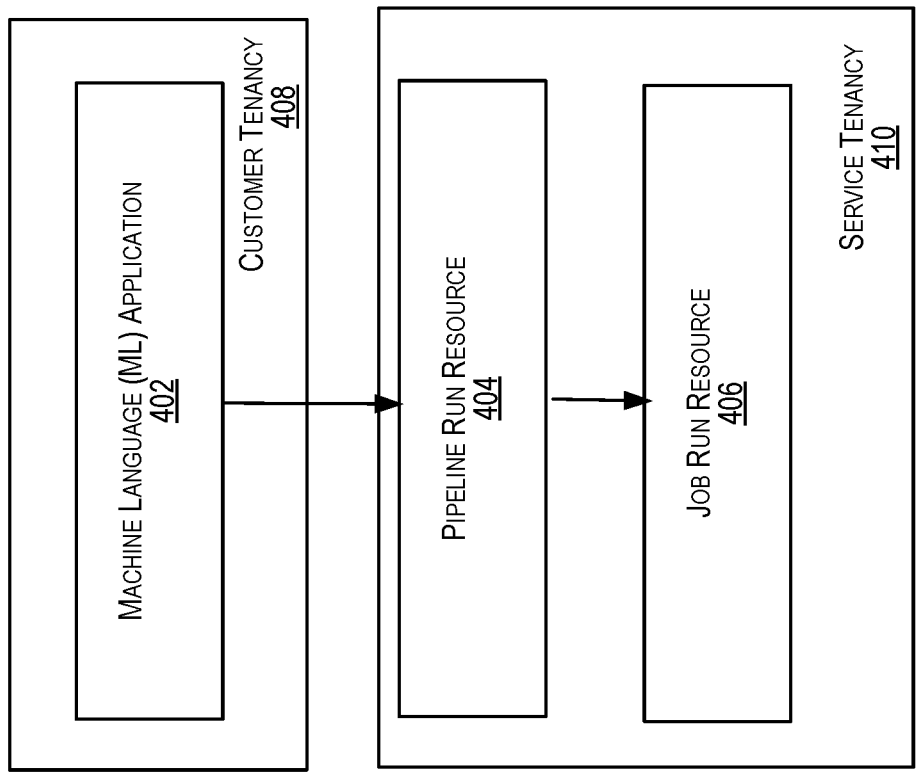
FIG. 4 depicts a hierarchy of resources composed in a Machine Language (ML) application, according to certain embodiments.

FIG. 4 depicts a hierarchy of resources composed in a Machine Language (ML) application, according to certain embodiments. In the example depicted in FIG. 4, the ML application 402 represents the highest-level (root) resource created in the customer tenancy. The Pipeline Run resource 404 and the Job Run resource 406 represent sub-resources that are composed within the ML application 402. The sub-resources 404 and 406 represent child resources of the root resource 402. Additionally, the Pipeline Run resource 404 and the Job Run resource 406 are also hierarchically related, where the Job Run Resource 406 is a child resource of its parent Pipeline Run resource 404. The internal compositions (for e.g., the Pipeline Run resource and the Job Run resource) of the ML application are usually hidden from the customer, who sees the ML application as a single entity (i.e., a single logical resource) in the customer tenancy 408. The sub-resources are typically provisioned by various downstream service control planes that reside in one or more service tenancies of the CSP. In the example depicted in FIG. 4, both the sub-resources, 404 and 406, are provisioned in a single service tenancy 410 in the CSP. In alternate embodiments, as depicted in FIG. 1, the sub-resources of a higher-level resource may be provisioned in different service tenancies.

The provisioning of resources 402, 404 and 406 may be performed by control planes that are associated with authoritative services that own/manage the resources in one or more service tenancies of the CSP as described in FIG. 1. For instance, using the example of the resources R1, R2 and R3 depicted in FIG. 1, a resource R1 (representing, for instance, an ML application 402) may be provisioned in the customer tenancy responsive to a resource creation request sent by a customer of the customer tenancy. The resource creation request is received by a customer control plane (e.g., 108) associated with the resource R1. Upon receiving the resource creation request, the service control plane of the resource R1 bootstraps/provisions an instance of the resource R1 and sets the endpoint of the resource R1 to the service control plane R1. The service control plane R1 then creates a resource principal identity for the resource R1 and may also provide trusted metadata associated with the resource R1 (e.g., tags, compartment identifier of the customer tenancy, and so on) to the customer. Once provisioned, the customer can interact with the resource R1 (i.e., the ML application) and write policies that grant the ML application access to other customer tenancy resources such as vault resources 118, object stores 120 and the like.

Upon creating the instance of the resource R1 (e.g., an instance of the ML Application) in the customer tenancy 102 as described above, the service control plane of the resource R1 then initiates the creation of its child resource R2 (e.g., the Pipeline Run Resource) by communicating with a service control plane R2 (e.g., 110) that is associated with the authoritative service that owns the resource R2. Upon receiving the resource creation request, the service control plane of the resource R2 bootstraps/provisions an instance of the resource R2 and sets the endpoint of the resource R2 to the service control plane. The service control plane of the resource R2 then creates a resource principal identity for the resource R2. The resource R3 (e.g., the Job Run resource) that is a child resource of resource of the Pipeline Run Resource is similarly provisioned by its service control plane R3 (e.g., 112).

Figure 5:
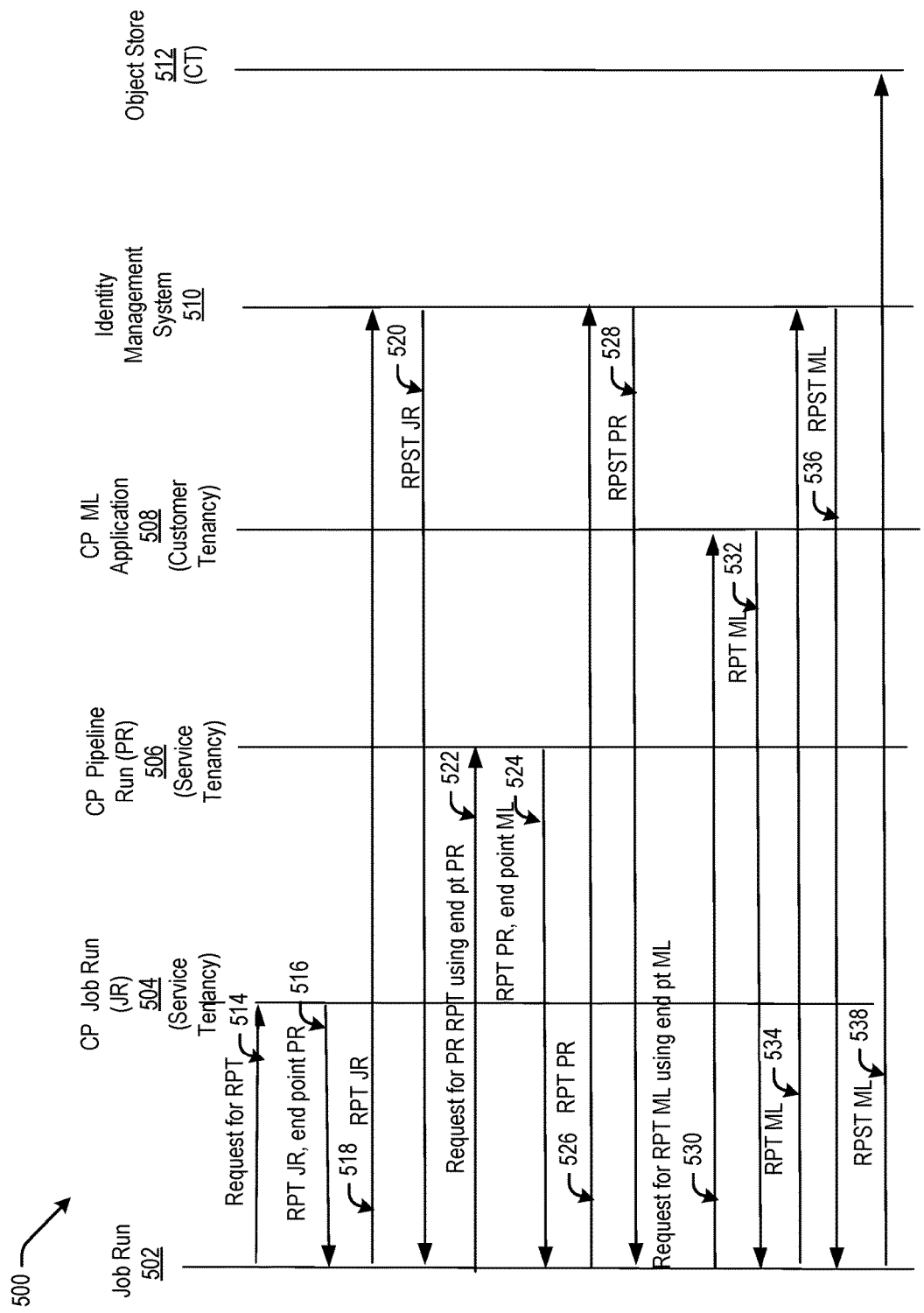
FIG. 5 is a sequence diagram illustrating a sequence of interactions that enable a nested lower-level resource of a ML application residing in a service tenancy to access a customer-owned resource residing in a customer tenancy, according to certain embodiments.

In certain situations, a sub-resource (e.g., the Job Run resource 406) composed within the higher-level ML application 402 may wish to access a customer-owned resource (e.g., an object storage resource) residing in the customer tenancy. FIG. 5 is a sequence diagram illustrating a sequence of interactions that enable a nested lower-level resource of a ML application residing in a service tenancy to access a customer-owned resource residing in a customer tenancy, according to certain embodiments. As described in the example depicted in FIG. 4, the Job Run resource is part of a resource hierarchy comprising a pipeline resource and a top-level ML application/resource. The Job Run resource and the Pipeline Run resource are child resources of the ML application and are hierarchically related to one another. The ML application represents the higher-level resource, the Pipeline Run resource is a child resource of the ML application and the Job Run resource is a child resource of its parent Pipeline Run resource.

As depicted in FIG. 5, processing is initiated at operation 514 when the Job Run resource 502 transmits a request to the service control plane that is associated with the authoritative service that owns the Job Run resource (CP JR 504) to request for its resource principal identifier (i.e., a RPT). The control plane of the Job Run resource validates the request and upon validation, issues the RPT for the Job Run resource. At operation 516, the control plane of the Job Run resource transmits the RPT of the Job Run resource along with information (e.g., endpoint information) identifying a resource that is in the next-level of the resource hierarchy. In certain embodiments, such as the embodiment depicted in FIG. 4, since the Job Run resource is a child resource of the Pipeline Run (PR) resource, which is its parent resource in the resource hierarchy, as a result of performing the operation 516, the Job Run resource 502 receives endpoint information identifying its next-level resource (i.e., the Pipeline Run resource). At operation 518, the Job Run resource transmits a request comprising its RPT to the identity management system (IDM) 510 to obtain a resource principal session token (RPST) for asserting its resource principal identity. As a result of performing the operation 518, the IDM 510 exchanges the RPT for the Job Run resource for its RPST. As previously described, the RPST for a resource is a temporary session token and a secure credential that enables the resource to authenticate itself (assert its resource principal identity) to other cloud-resources owned by the CSP. The identity management system 510 shown in FIG. 5 may be implemented in a similar manner as the identity management system described in FIG. 3 and FIG. 1.

At operation 520, the identity management system 510 transmits the RPST to the Job Run resource. At operation 522, the Job Run resource uses its RPST that it obtained in 520 to call the endpoint of the next level resource (Pipeline Run Resource) in the resource hierarchy. At operation 524, the control plane of the Pipeline Run Resource (CP PR 506) receiving the call validates the request and upon validation, returns the RPT for the Pipeline Run resource and the endpoint information of a resource, if present, that is in the next-level of the resource hierarchy. In the example depicted in FIG. 5, the control plane 506 of the Pipeline Run resource identifies the ML application/ML resource as the next-level resource in the resource hierarchy and returns the RPT of the Pipeline Run resource as well as endpoint information of the ML application to the Job Run resource. At operation 526, the Job Run resource transmits a request comprising the RPT of the Pipeline Run resource to the identity management system (IDM) 310 to obtain a resource principal session token (RPST) for the Pipeline Run resource. As a result of performing the operation 526, the IDM 510 exchanges the RPT for the Pipeline Run resource for its RPST and at operation 528, the IDM 510 transmits the RPST of the Pipeline Run resource to the Job Run resource.

At operation 530, the job run resource uses the RPT of the Pipeline Run resource and makes a call to the endpoint of the next-level resource (i.e., ML application) in the resource hierarchy to obtain a RPT for the ML application. At operation 532, the control plane of the ML Application 508 validates the request and upon validation, issues the RPT of the ML Application. At operation 534, the Job Run resource requests for an RPST for the ML application from the identity management system and at operation 536, the Job Run resource obtains the RPST for the ML Application from the identity management system 510. The Job run resource obtains the RSPT for a resource until it reaches the root level (in this example, the ML application instance) in the resource hierarchy.

As a result of executing operation 538, the Job Run resource has three RSPTs, a first RPST representing the identify for itself, a second RPST representing the identity for its parent resource (the Pipeline Run resource) and a third RPST representing the identity of its grandparent resource (the ML application). Since the third RPST represents the identity of highest-level (root) resource (i.e., ML application) in the resource hierarchy and the ML application resides in the customer tenancy, a nested lower-level resource such as the Job Run resource can use the RPST of the ML application resource o assert its resource principal identity when performing various operations such as to access a customer-owned resource (object store) 512. The customer-owned resource sees that the Job Run resource is associated with RPST with tenancy information and a service identifier that belongs to the customer tenancy and enables the Job Run resource to access the customer-owned resource without requiring the Job Run resource to make a cross-tenancy call.

Figure 6:
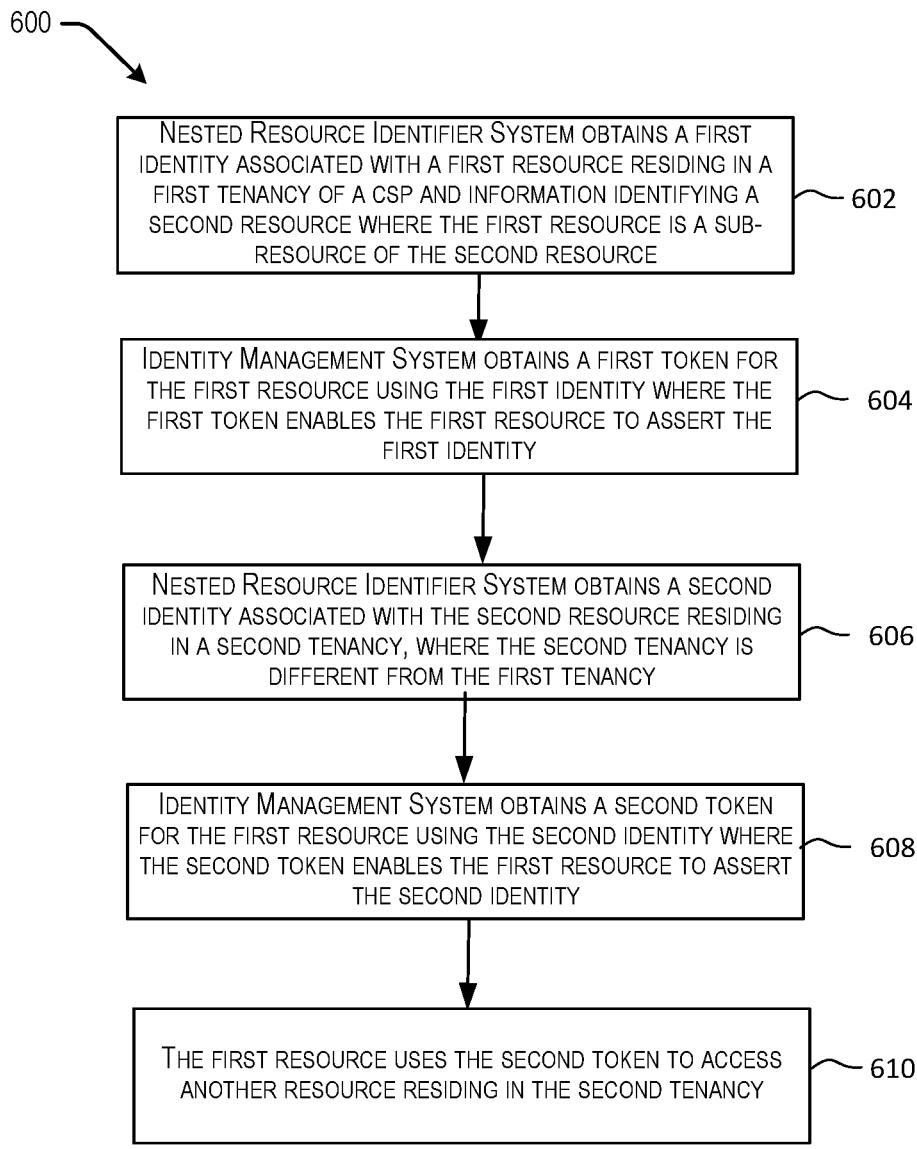
FIG. 6 depicts an example of a process performed by the nested resource principals management system and the identity management system within the computing environment depicted in FIG. 1, according to certain embodiments.

FIG. 6 depicts an example of a process 600 performed by the nested resource principals management system and the identity management system within the computing environment depicted in FIG. 1, according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 600 presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 6 may be performed by one or more subsystems (e.g., 114 and 116) shown in FIG. 1

At block 602, processing is initiated when the nested resource principals management system obtains a first identity associated with a first resource residing in a first tenancy of a CSP. In certain examples, the first resource may represent a nested sub-resource that resides in a service tenancy of the CSP, where the resource is part of a higher-level resource (second resource) that resides in the customer tenancy. For instance, as depicted in FIG. 2, the higher-level resource (second resource) may represent an FA resource and the sub-resource (first resource) may represent a database resource that is composed within the FA resource. The first identity associated with the first resource may correspond to a resource principal identity (RPT) associated with the first resource. As previously described, the RPT is a secure identity provided to a cloud infrastructure resource that enables a resource to be authorized to access other cloud infrastructure resources.

In a certain implementation, the nested resource principals management system obtains the RPT for the first resource from the control plane associated with the resource as described in relation to FIG. 2 and FIG. 3. In certain embodiments, as part of the processing performed in step 602, the nested resource principals management system also obtains information identifying the second resource. The information identifies the endpoint of the second resource and may represent a URL of the resource endpoint for the second resource.

At block 604, the identity management system obtains a first token for the first resource using the first identity obtained in block 602. The first token enables the first resource to assert the first identity. The first token corresponds to a resource principal session token (RPST) associated with the first resource. As previously discussed, the RPST for a resource is a temporary session token and a secure credential that enables the resource to authenticate itself (assert its resource principal identity) to other cloud-resources owned by the CSP.

At block 606, the nested resource principals management system obtains a second identity associated with the second resource residing in the service tenancy. The second identity may correspond to a resource principal identity (RPT) associated with the second resource and may be obtained by the nested resource principals management system from the control plane associated with the second resource as described in relation to FIG. 2 and FIG. 3.

At block 608, the identity management system obtains a second token for the first resource using the second identity. The second token enables the first resource to assert the second identity. In a certain implementation, the second token corresponds to a resource principal session token (RPST) associated with the second resource.

At block 610, the first resource uses the second token to access a customer-owned resource that resides in the customer tenancy. The customer-owned resource sees the first resource with an RPST associated with the second resource having a service identifier and tenancy information which is in the customer tenancy and enables the first resource to access the customer-owned resource without requiring the first resource to make a cross-tenancy call.

The disclosed system enables a customer to write robust and simple access control policies that provide streamlined and secure access management of cloud resources. Using the capabilities provided by the disclosed system, a customer has to only write a single policy that is directed to the higher-level resource owned by the customer in the customer tenancy. Since the customer does not have to write policies directed to the sub-resources that are composed within a higher-level resource, the details (e.g., resource principal identities) of the sub-resources do not have to be exposed to the customer. Additionally, changes can be made to sub-resources (e.g., adding new resources, changing the hierarchy or the resources, deleting a resource and so on) composed within a higher-level resource without impacting the customer or compromising the security of the resources.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
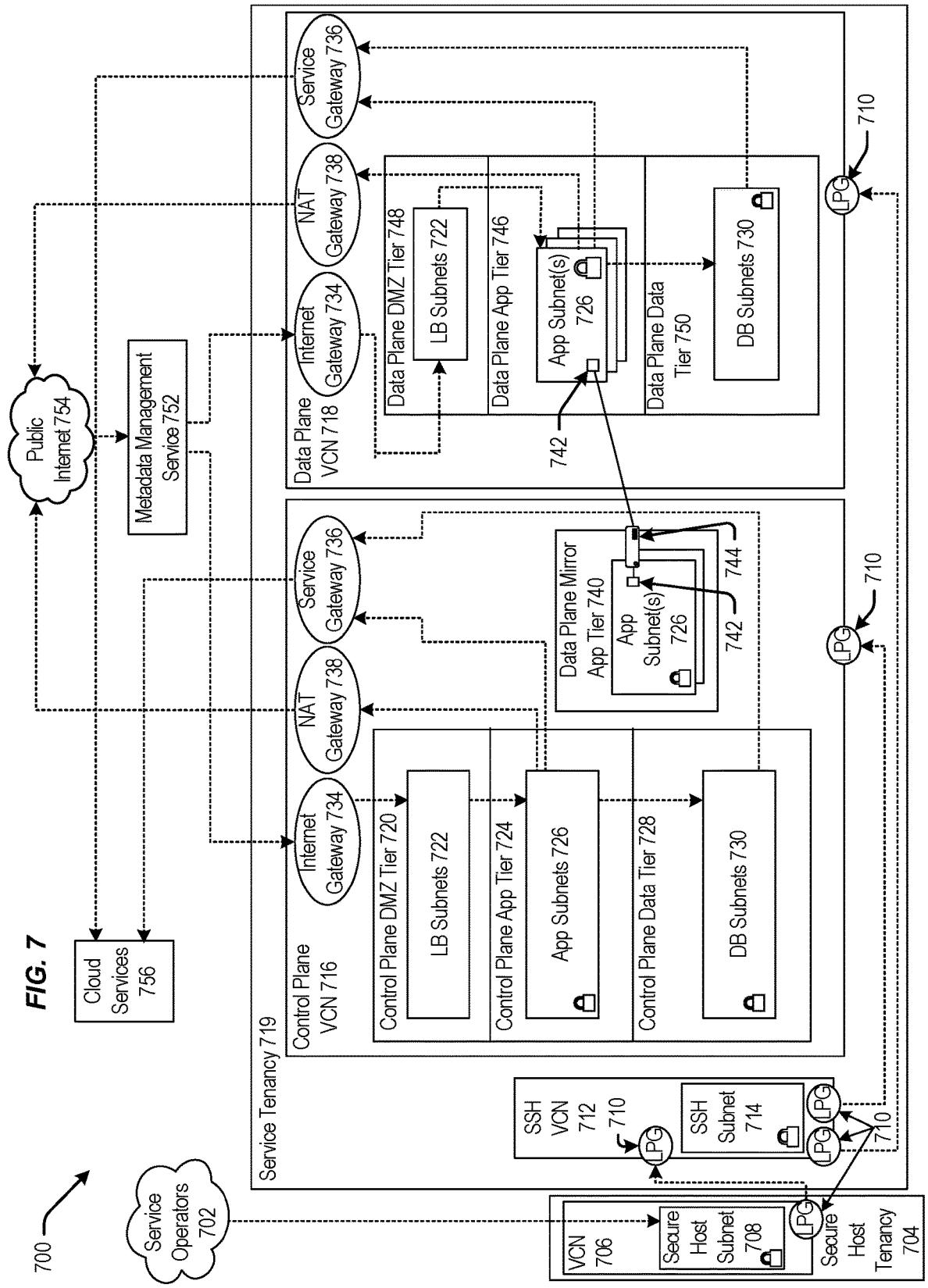
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
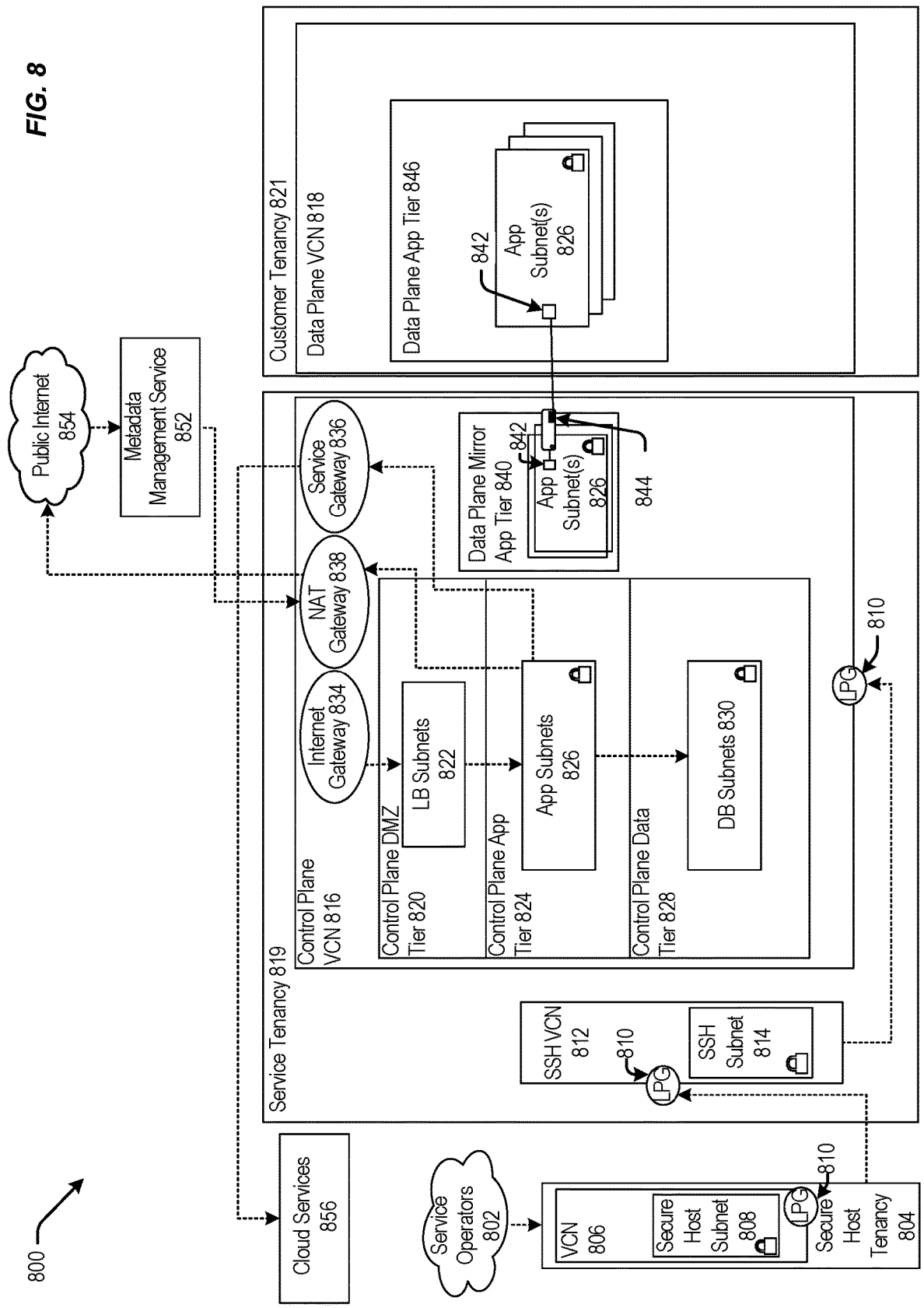
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
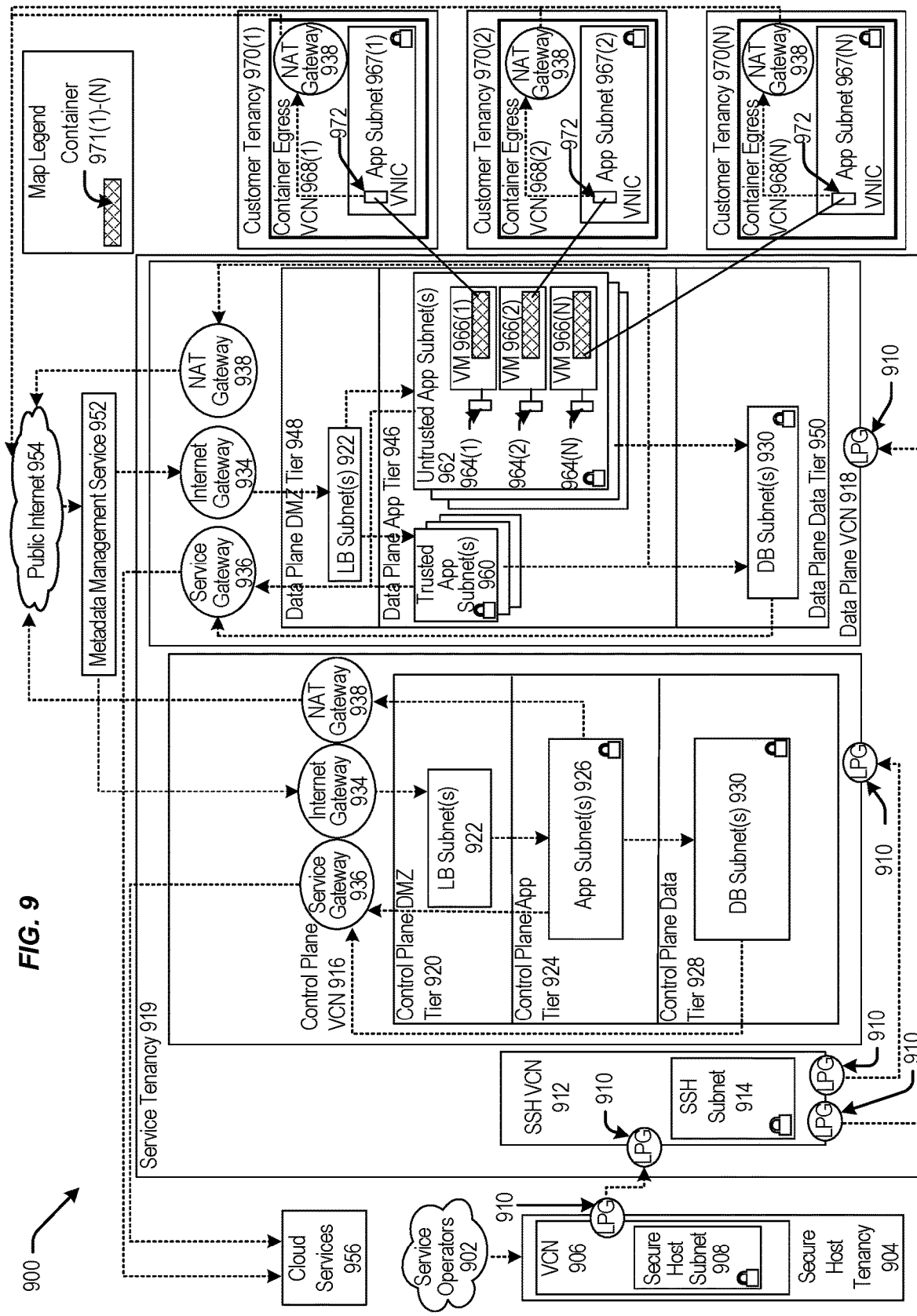
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
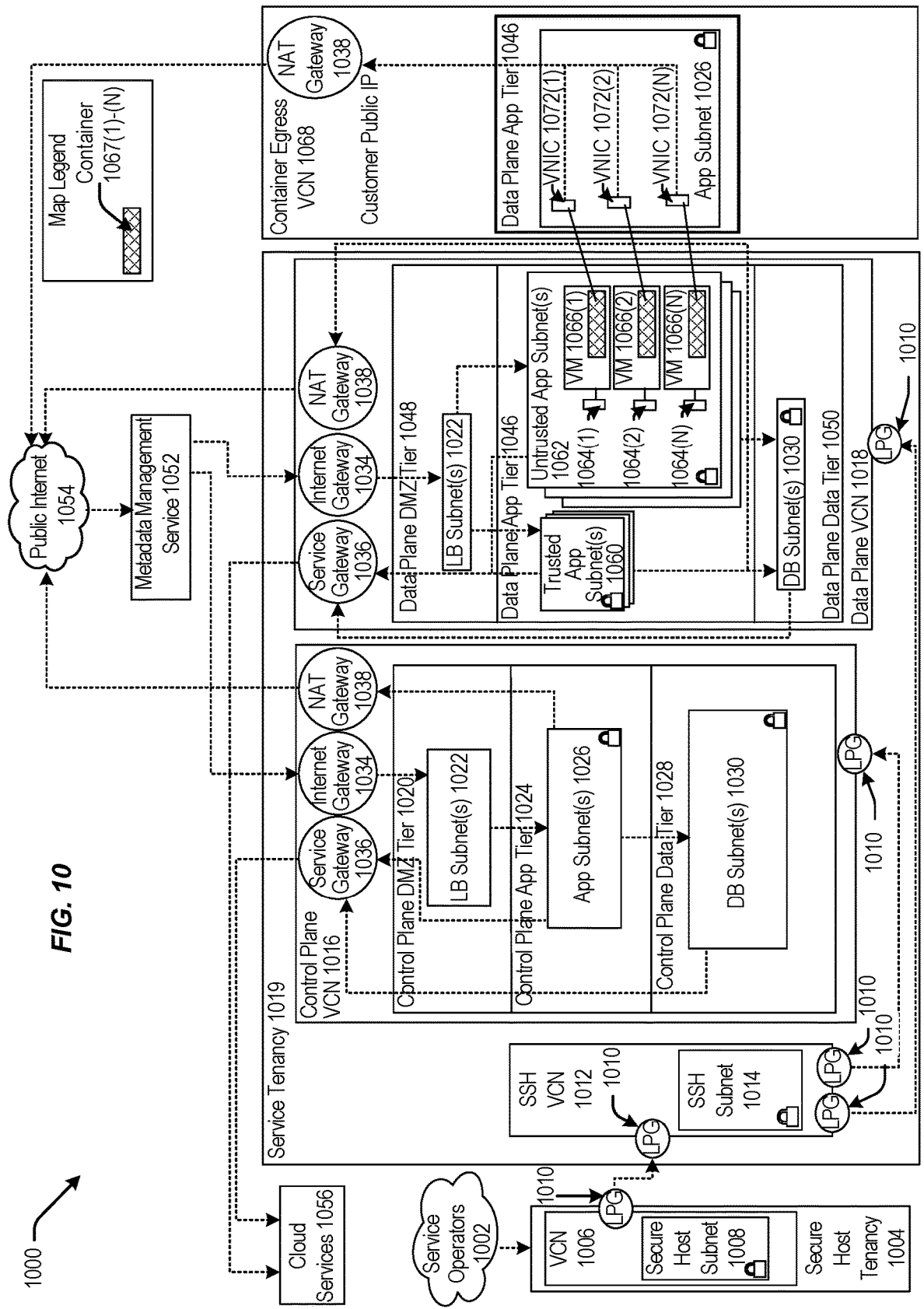
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
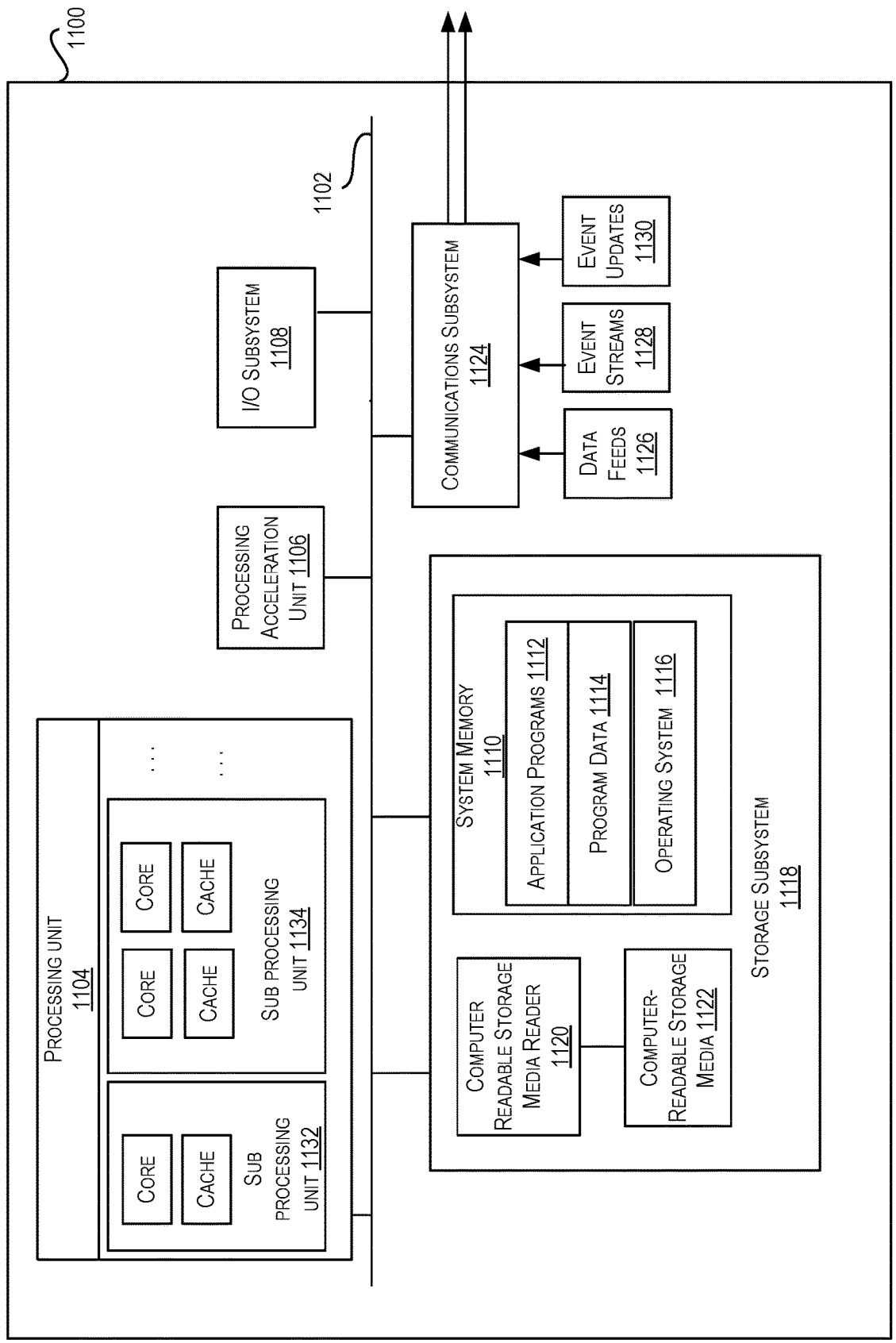
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
obtaining, for a first resource residing in a service tenancy of a plurality of service tenancies provided by a cloud service provider (CSP), a first identity associated with the first resource and information identifying a second resource, wherein the information identifying the second resource represents a Uniform Resource Locator (URL) of a resource endpoint associated with the second resource and wherein the first resource is a sub-resource of the second resource;
obtaining a first token for the first resource using the first identity, the first token enabling the first resource to assert the first identity;
obtaining, for the first resource, a second identity associated with the second resource using the first token and the information identifying the second resource, wherein the second resource is created in a customer tenancy provided by the CSP;
obtaining a second token for the first resource using the second identity, the second token enabling the first resource to assert the second identity; and
using, by the first resource, the second token to access another resource residing in the customer tenancy.

2. The method of claim 1, wherein the service tenancy represents a provisioning platform for provisioning, configuring, and managing a plurality of cloud resources associated with a plurality of cloud services provided by the CSP.

3. The method of claim 1, wherein the customer tenancy represents an account created for a customer of the CSP that subscribes to one or more services provided by the CSP.

4. The method of claim 1, wherein the first identity associated with the first resource is obtained from a control plane associated with a service that owns the first resource in the service tenancy of the CSP.

5. The method of claim 1, wherein the first identity represents a resource principal identity associated with the first resource that enables the first resource to be authorized to access a plurality of cloud resources provided by the CSP.

6. The method of claim 1, wherein the first token represents a resource principal session token associated with the first resource, wherein the resource principal session token represents a temporary session token and a secure credential associated with the first resource that enables the first resource to authenticate itself to a plurality of cloud resources provided by the CSP.

7. The method of claim 1, wherein the second identity for the second resource is obtained using the information identifying the second resource and wherein the second identity represents a resource principal identity associated with the second resource that enables the second resource to be authorized to access a plurality of cloud resources provided by the CSP.

8. The method of claim 1, wherein the second identity for the second resource is obtained from a customer control plane associated with the second resource.

9. The method of claim 1, wherein the second token represents a resource principal session token associated with the second resource, the resource principal session token representing a temporary session token and a secure credential associated with the second resource that enables the second resource to authenticate itself to one or more resources provided by the CSP.

10. A system comprising:
a memory; and
one or more processors configured to perform processing, the processing comprising:
obtaining, for a first resource residing in a service tenancy of a plurality of service tenancies provided by a cloud service provider (CSP), a first identity associated with the first resource and information identifying a second resource, wherein the information identifying the second resource represents a Uniform Resource Locator (URL) of a resource endpoint associated with the second resource and wherein the first resource is a sub-resource of the second resource;
obtaining a first token for the first resource using the first identity, the first token enabling the first resource to assert the first identity;
obtaining, for the first resource, a second identity associated with the second resource using the first token and the information identifying the second resource, wherein the second resource is created in a customer tenancy provided by the CSP;
obtaining a second token for the first resource using the second identity, the second token enabling the first resource to assert the second identity; and
using, by the first resource, the second token to access another resource residing in the customer tenancy.

11. The system of claim 10, wherein the service tenancy represents a provisioning platform for provisioning, configuring, and managing a plurality of cloud resources associated with a plurality of cloud services provided by the CSP.

12. The system of claim 10, wherein the customer tenancy represents an account created for a customer of the CSP that subscribes to one or more services provided by the CSP.

13. The system of claim 10, wherein the first identity represents a resource principal identity associated with the first resource that enables the first resource to be authorized to access a plurality of cloud resources provided by the CSP.

14. The system of claim 10, wherein the first token represents a resource principal session token associated with the first resource, wherein the resource principal session token represents a temporary session token and a secure credential associated with the first resource that enables the first resource to authenticate itself to a plurality of cloud resources provided by the CSP.

15. A non-transitory computer-readable medium storing instructions executable by a computer system that, when executed by one or more processors of the computer system, cause the one or more processors to perform operations comprising:
obtaining, for a first resource residing in a service tenancy of a plurality of service tenancies provided by a cloud service provider (CSP), a first identity associated with the first resource and information identifying a second resource, wherein the information identifying the second resource represents a Uniform Resource Locator (URL) of a resource endpoint associated with the second resource and wherein the first resource is a sub-resource of the second resource;
obtaining a first token for the first resource using the first identity, the first token enabling the first resource to assert the first identity;
obtaining, for the first resource, a second identity associated with the second resource using the first token and the information identifying the second resource, wherein the second resource is created in a customer tenancy provided by the CSP;
obtaining a second token for the first resource using the second identity, the second token enabling the first resource to assert the second identity; and
using, by the first resource, the second token to access another resource residing in the customer tenancy.

16. The non-transitory computer-readable medium of claim 15, wherein the first identity represents a resource principal identity associated with the first resource that enables the first resource to be authorized to access a plurality of cloud resources provided by the CSP.

17. The non-transitory computer-readable medium of claim 15, wherein the service tenancy represents a provisioning platform for provisioning, configuring, and managing a plurality of cloud resources associated with a plurality of cloud services provided by the CSP.

18. The non-transitory computer-readable medium of claim 15, wherein the customer tenancy represents an account created for a customer of the CSP that subscribes to one or more services provided by the CSP.

* * * * *

UNITED STATES PATENT AND TRADEMARK OFFICE
CERTIFICATE OF CORRECTION

| | | |
|---|---|---|
| PATENT NO. | : 12,137,145 B1 | Page 1 of 1 |
| APPLICATION NO. | : 18/373707 | |
| DATED | : November 5, 2024 | |
| INVENTOR(S) | : Bhuiyan et al. | |

It is certified that error appears in the above-identified patent and that said Letters Patent is hereby corrected as shown below:

In the Specification

In Column 7, Line 23, delete "that that" and insert -- that --, therefor.

In Column 11, Line 66, delete "RSPT" and insert -- RPST --, therefor.

In Column 12, Line 3, delete "RSPTs," and insert -- RPSTs, --, therefor.

In Column 15, Line 43, delete "RSPT" and insert -- RPST --, therefor.

In Column 15, Line 47, delete "RSPTs," and insert -- RPSTs, --, therefor.

In Column 16, Line 16, delete "1" and insert -- 1. --, therefor.

Signed and Sealed this
Fourth Day of February, 2025

Coke Morgan Stewart
*Acting Director of the United States Patent and Trademark Office*